(12) United States Patent
Ha

(10) Patent No.: US 9,789,638 B2
(45) Date of Patent: Oct. 17, 2017

(54) MOVING APPARATUS FOR AN INJECTION MOLDING MACHINE

(71) Applicant: Husky Injection Molding Systems Ltd., Bolton (CA)

(72) Inventor: Gerry Ha, Vaughan (CA)

(73) Assignee: HUSKY INJECTION MOLDING SYSTEMS LTD., Bolton, Ontario (CA)

(*) Notice: Subject to any disclaimer, the term of this patent is extended or adjusted under 35 U.S.C. 154(b) by 127 days.

(21) Appl. No.: 14/767,472

(22) PCT Filed: Jan. 22, 2014

(86) PCT No.: PCT/CA2014/050044
§ 371 (c)(1),
(2) Date: Aug. 12, 2015

(87) PCT Pub. No.: WO2014/138943
PCT Pub. Date: Sep. 18, 2014

(65) Prior Publication Data
US 2015/0367547 A1  Dec. 24, 2015

Related U.S. Application Data

(60) Provisional application No. 61/783,972, filed on Mar. 14, 2013.

(51) Int. Cl.
*B29C 45/42* (2006.01)
*B29B 11/08* (2006.01)
(Continued)

(52) U.S. Cl.
CPC ............. *B29C 45/42* (2013.01); *B29B 11/08* (2013.01); *B29C 45/7207* (2013.01);
(Continued)

(58) Field of Classification Search
CPC ............ B29C 2045/7214; B29C 45/42; B29C 45/7207
See application file for complete search history.

(56) References Cited

U.S. PATENT DOCUMENTS

| 4,534,006 A | * | 8/1985 | Minucciani | B25J 9/023 318/568.13 |
| 4,721,005 A | * | 1/1988 | Yoshiji | B25J 9/023 414/751.1 |

(Continued)

FOREIGN PATENT DOCUMENTS

| CA | 2589424 A1 | 6/2006 |
| CA | 2607310 A1 | 4/2009 |

(Continued)

OTHER PUBLICATIONS

European Search Report, Aug. 12, 2016, 8 pages.
PCT International Search Report; Zhang, Pengfei; Apr. 10, 2014; 3 pages.

*Primary Examiner* — Jill Heitbrink

(57) ABSTRACT

A moving apparatus is disclosed that may be for moving a tool of an injection molding machine. It may comprise a beam having at least a part that extends generally longitudinally in a first direction. The beam may be configured such that the tool can be moved relative to the beam in said first direction. The apparatus may also comprise an actuator for moving the at least a part of the beam in a second direction. Also disclosed is a method of moving a tool. The method may comprise: (a) moving a tool along a beam that generally extends in a first direction; and (b) moving at least a part of the beam in a second direction. The first directions may be orthogonal to second directions.

7 Claims, 16 Drawing Sheets

(51) Int. Cl.
*B29K 105/00* (2006.01)
*B29C 45/72* (2006.01)
*B29K 267/00* (2006.01)

(52) U.S. Cl.
CPC *B29C 2045/7214* (2013.01); *B29K 2105/258* (2013.01); *B29K 2267/003* (2013.01)

(56) References Cited

U.S. PATENT DOCUMENTS

| | | |
|---|---|---|
| 5,000,654 A | 3/1991 | Shiotani |
| 6,386,859 B1 * | 5/2002 | Hehl ................ B29C 45/42 425/438 |
| 2012/0031217 A1 | 2/2012 | Jin et al. |

FOREIGN PATENT DOCUMENTS

| | | |
|---|---|---|
| WO | 9219434 A1 | 11/1992 |
| WO | 2011120154 A1 | 10/2011 |

\* cited by examiner

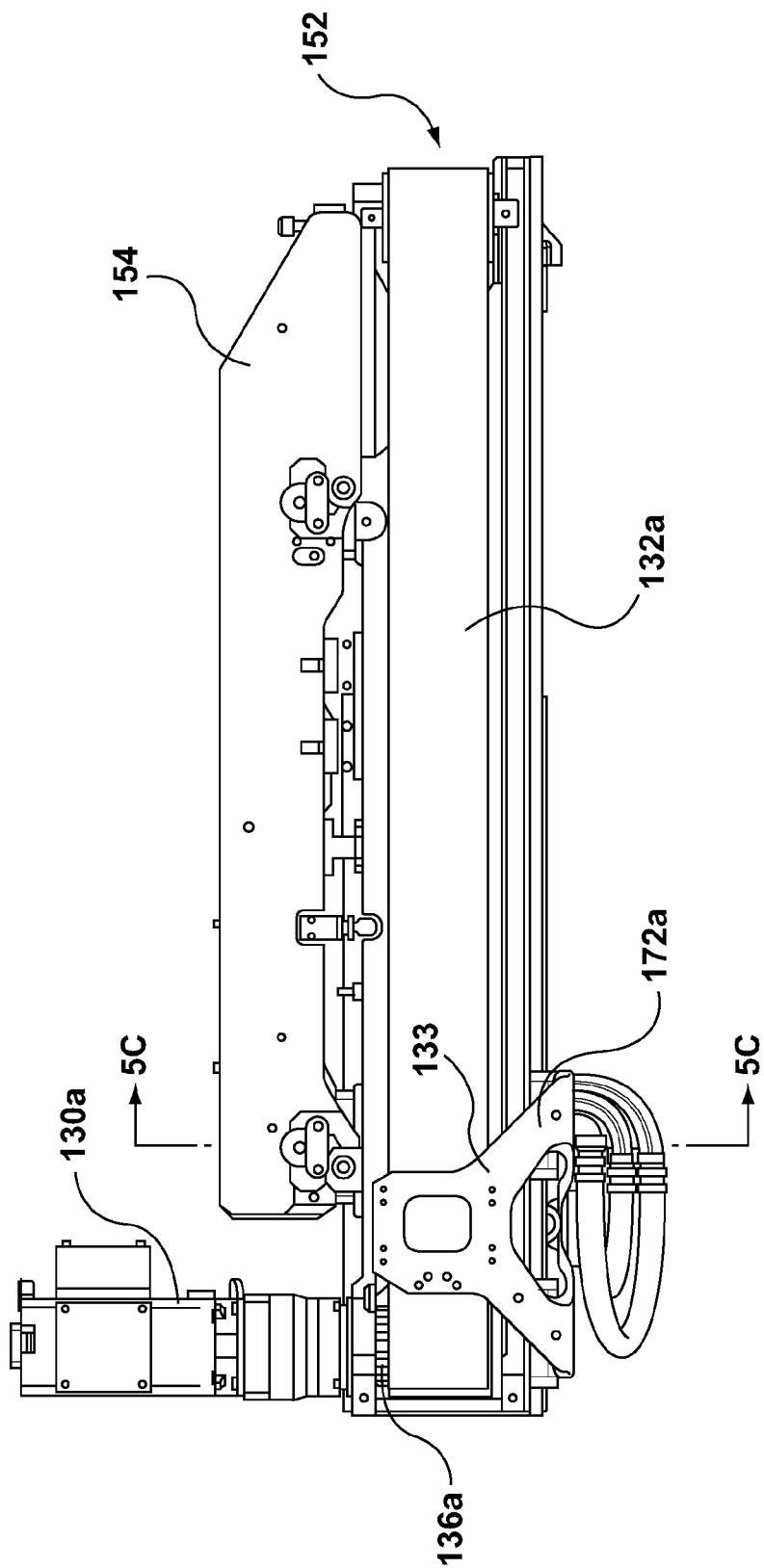

MOVING APPARATUS FOR AN INJECTION MOLDING MACHINE

TECHNICAL FIELD

This relates to a moving apparatus for an injection molding machine, and in particular a moving apparatus for moving a tool.

BACKGROUND

Injection mold machines can be used to form various molded articles/parts using an injection molding process. One example of a molded article that can be formed, for example, from Polyethylene Teraphalate (PET) material is a preform that is capable of being subsequently blown into a beverage container, such as a bottle or the like.

Injection molding of PET material involves heating the molding material (ex. PET pellets, etc.) to a homogeneous molten state and injecting, under pressure, the melted PET material into mold cavities of a closed mold to form a group of parts/articles such as a plurality of PET performs. At a suitable time, the mold can be opened allowing a tool carried by a moving apparatus such as a moving apparatus to move between the mold halves of the mold to an inbound position where the group of parts can be ejected from the mold and transferred to the tool in a manner known to those skilled in the art.

Once the parts are transferred to the tool, the tool can be moved again by the moving apparatus to an outbound position to allow the mold to be closed again and then commence making a new group of parts in the mold. When the tool is in an outbound position, a treatment device may subject the parts that are being held in the tool to a treatment (e.g. convective cooling, thermoforming, etc.). Furthermore, at a suitable time (e.g. once the parts have been thoroughly cooled to a dimensionally stable temperature), the treatment device may remove the parts from the tool for further processing (e.g. placement onto a conveyor for packaging, or into a blow molding machine).

Tools can be configured to carry and hold at one time more than one group of parts made at different times by the injection mold machine. In this regard, the tool can be cycled between inbound and outbound positions and may retrieve and hold more than one group of parts at any one time. During the cycling of the tool to retrieve successive group of parts, it may be necessary to not only adjust the position of the tool in a horizontal direction, but also adjust the position of the tool in a vertical direction relative to the mold, so that each group may be received by the tool.

SUMMARY

According to an aspect, there is provided a moving apparatus operable for moving a tool of an injection molding machine. The moving apparatus may comprise a beam having at least a part that extends generally longitudinally in a first direction. The beam may be configured such that a tool can be moved relative to said beam in the first direction. Also, an actuator may be provided that is operable to move the at least a part of the beam in a second direction.

According to another aspect there is provided an injection molding machine comprising a moving apparatus. The moving apparatus may comprising a beam having at least a part that extends generally longitudinally in a first direction. The beam may be being configured such that said tool may be moved relative to the beam in the first direction. An actuator may also be provided that is operable to move said at least a part of said beam in a second direction.

According to another aspect, there is provided a method of moving a tool used in an injection molding machine. The method comprises moving a tool along a beam that generally extends in a first direction; and moving at least a part of the beam in a second direction.

These and other aspects and features of non-limiting embodiments will now become apparent to those skilled in the art upon review of the following description of specific non-limiting embodiments in conjunction with the accompanying drawings.

DETAILED DESCRIPTION OF THE DRAWINGS

The non-limiting embodiments will be more fully appreciated by reference to the accompanying drawings, in which:

FIG. 5B is a plan view of the portion of FIG. 5A;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

Reference will now be made in detail to various non-limiting embodiment(s) of a moving apparatus for use in an injection molding system. It should be understood that other non-limiting embodiment(s), modifications and equivalents will be evident to one of ordinary skill in the art in view of the non-limiting embodiment(s) disclosed herein and that these variants should be considered to be within scope of the appended claims.

Furthermore, it will be recognized by one of ordinary skill in the art that certain structural and operational details of the non-limiting embodiment(s) discussed hereafter may be modified or omitted (i.e. non-essential) altogether. In other instances, well known methods, procedures, and components have not been described in detail.

Figure 1:
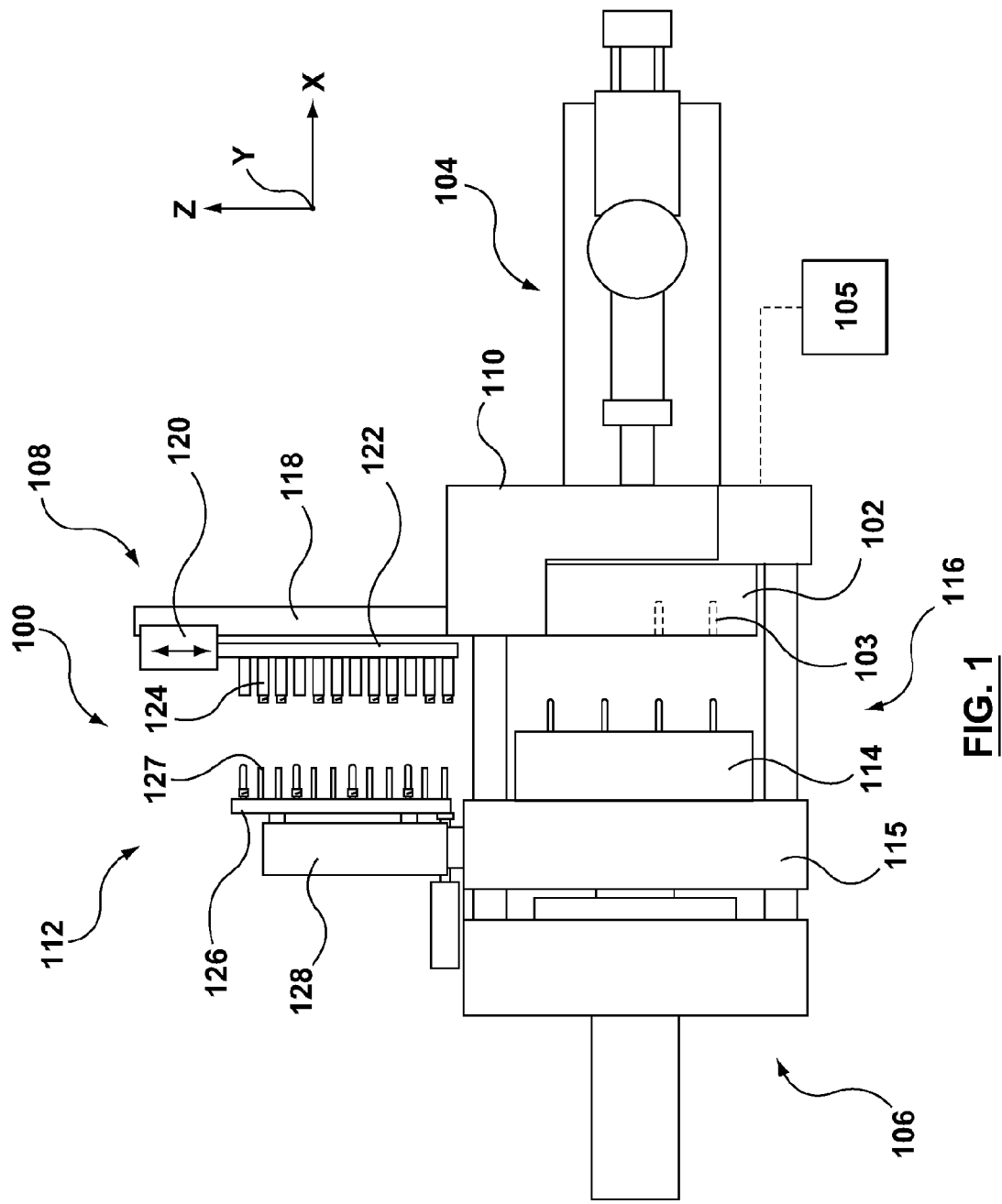
FIG. 1 is a top plan schematic diagram of an injection molding machine.
Figure 2A:
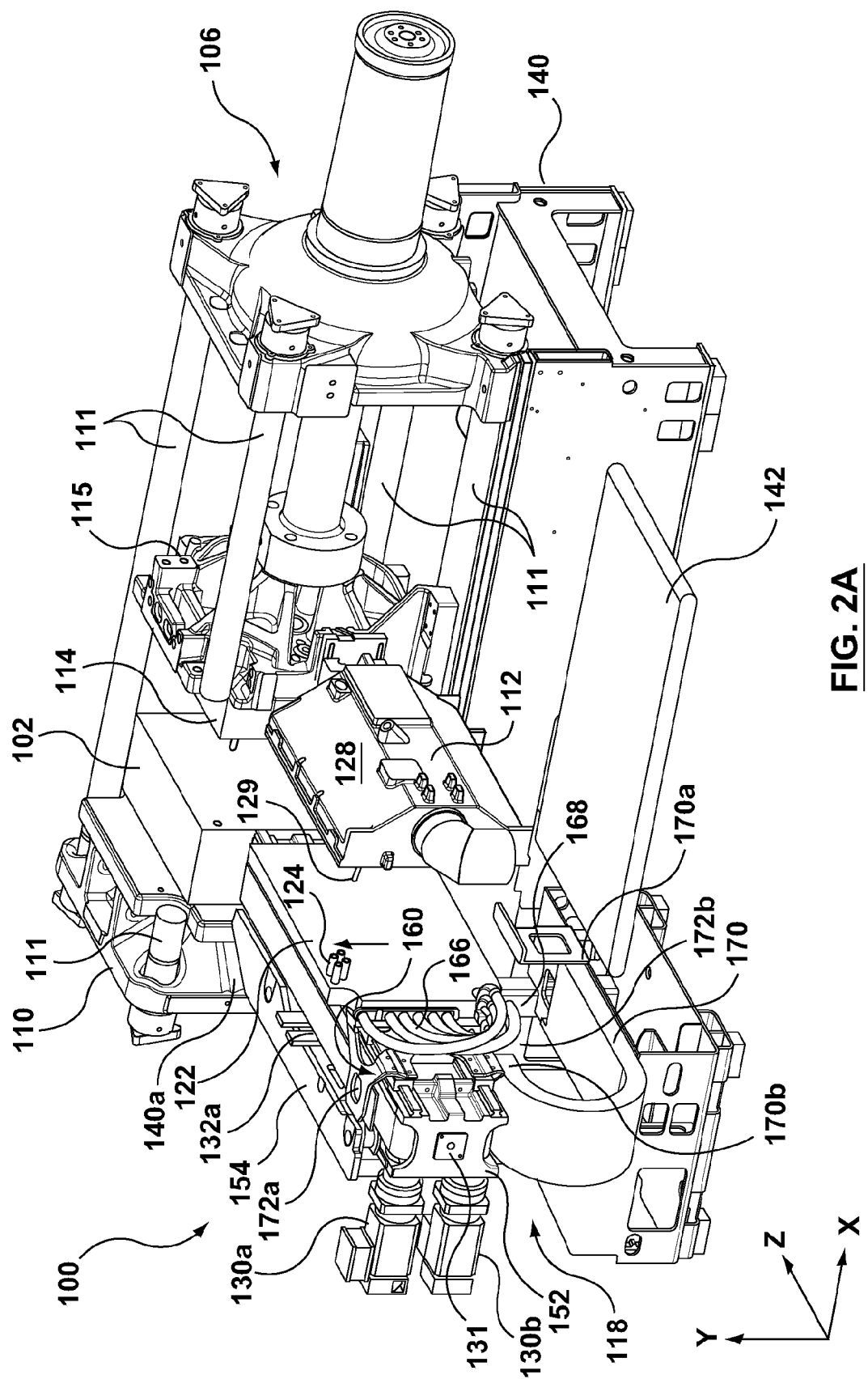
FIG. 2A is perspective view of a portion of a machine like the machine of FIG. 1, shown with a tool in an outbound operational configuration.
Figure 2B:
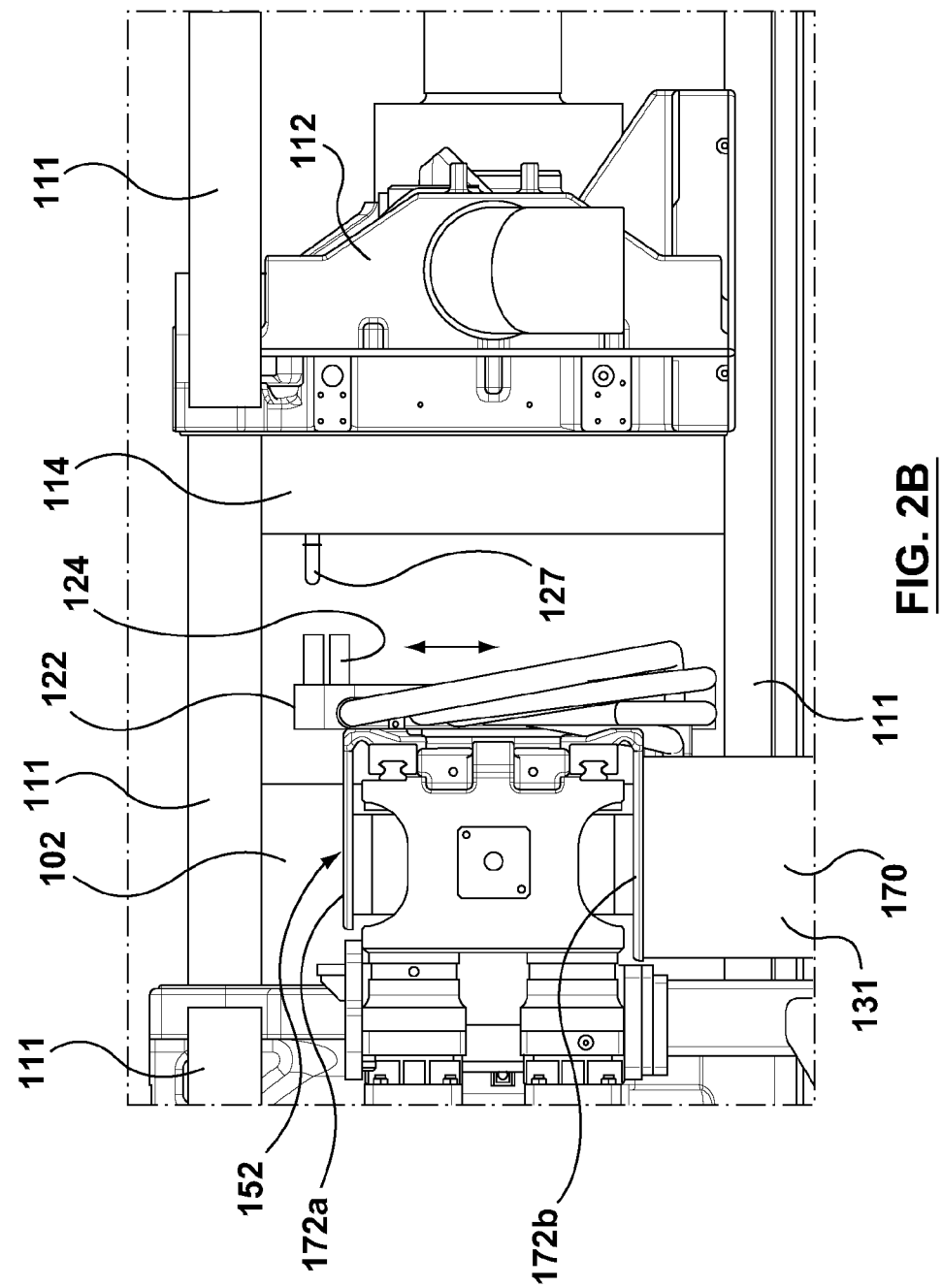
FIG. 2B is a partial side view of the portion of FIG. 2A in the same operational configuration as depicted in FIG. 2A.

By way of overview and with particular reference to FIGS. 1, 2A and 2B, a molding machine that may be an injection molding machine 100 may in general be conventionally configured and may comprise an injection mold 116 having a cavity mold half 102 and an opposite core mold half 114. Injection molding machine 100 may also include an injection unit 104, a clamping unit 106, and a treatment unit 112. Injection molding machine 100 may also include an improved moving apparatus generally designated 108. The operation of injection molding machine 100 and its components may be controlled by a controller 105 such as, for example, a programmable logic controller (PLC) or industrial computer. Communication links between various components of injection molding machine 100 and controller 105 may be provided and such links may be wired and/or wireless.

Cavity mold half 102 may contain a plurality of mold cavities 103, and cavity mold half 102 may be attached to a stationary platen 110 of the injection molding machine 100. The core mold half 114 may have a corresponding plurality of mold cores 127 and the core mold half 114 may be attached to a moving platen 115 of the injection molding machine 100. Thus the core mold half 114 may be capable of reciprocating movement in the X direction relative to the cavity mold half 102 between a mold open and a mold closed configuration. The stationary platen 110 and the clamping unit 106 may be linked by tie bars 111, with a part of one tie bar 111 omitted for clarity.

Moving apparatus 108 may include a support that may be a Z axis beam 118 (i.e. a beam extending generally parallel to the Z axis). The Z axis may typically be oriented horizontally, but other orientations in space for the Z axis, and the corresponding mutually orthogonal X and Y axes, are possible. Z axis beam 118 may have a beam support that may be a fixed part 154 of Z axis beam 118 (see FIG. 2A), and that fixed part 154 may be fixedly attached at or near one proximal end thereof directly to a side portion of the stationary platen 110. This may provide Z axis beam 118 with a relatively high degree of rigidity, and thus reduce the amount of deflection of the beam 118 as a Z axis carriage 120 carrying a tool 122 moves along the Z axis beam 118. Z axis carriage 120 may be supported by said Z axis beam 118 and be mounted for reciprocal movement in the Z direction backwards and forward along the Z axis beam 118. Z axis carriage 120 may be configured to permit the mounting thereto of tool 122 (which may be referred to as an "End of Arm Tool" or "EOAT"). Tool 122 may also be what is commonly referred to as a "multi-position take off device" and may include a plurality of part carriers 124. The part carriers 124 may be operable to receive molded parts ejected from mold 116 and then facilitate their transfer to treatment unit 112. Part carriers 124 may also be equipped with cooling capabilities for cooling parts being held by the tool 122. Z axis beam 118 may also have a moving part 152 (see FIGS. 2A and 2B) that may be configured for reciprocating backwards and forwards (typically upward and downward) movement in a direction generally parallel to the Y-axis relative to fixed part 154 of Z axis beam 118.

Figure 2C:
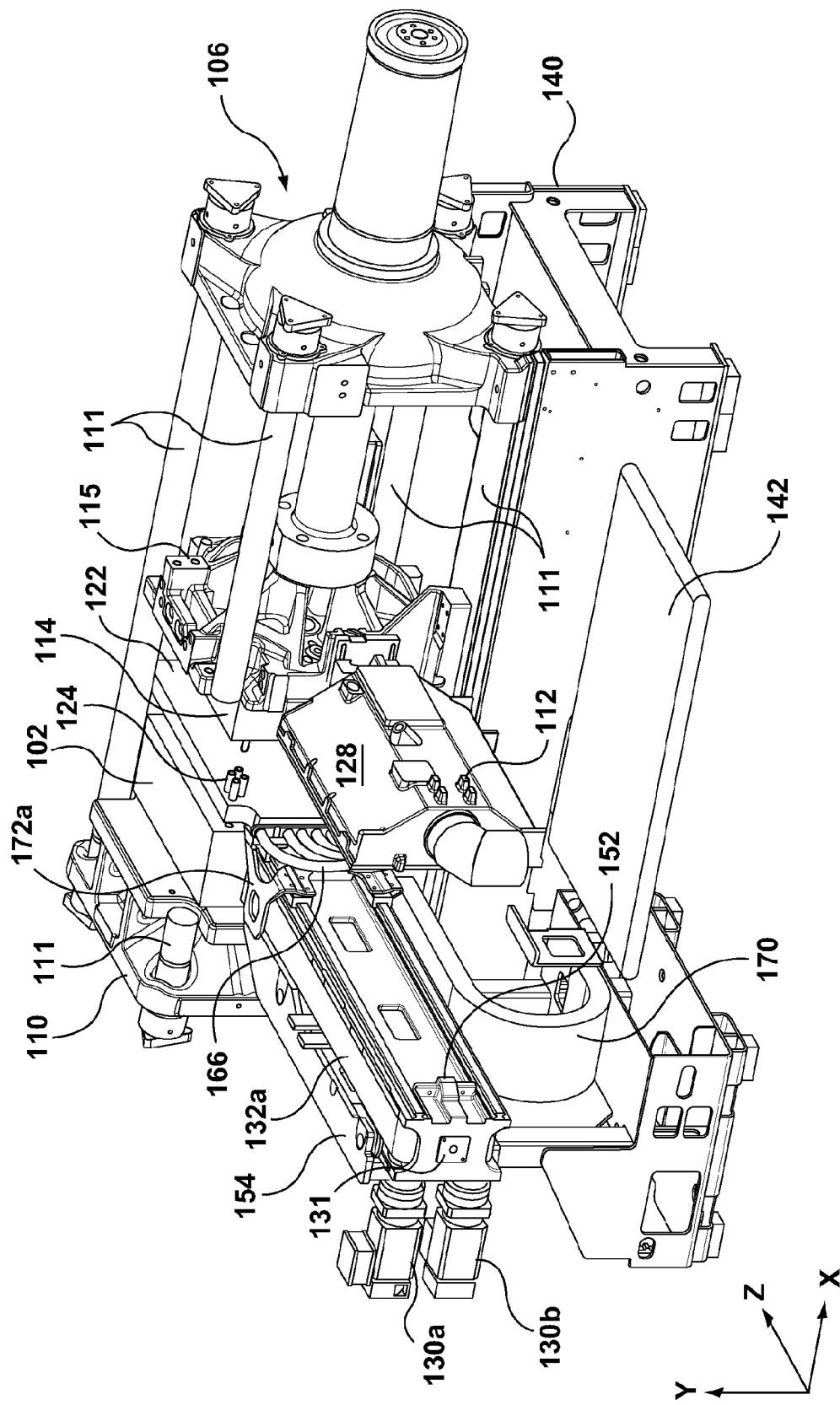
FIG. 2C is front perspective view of a portion of the machine of FIG. 1, shown with a tool in an inbound operational configuration.

In general operation, when the cavity mold half 102 and core mold half 114 of mold 116 are in a closed configuration, the mold is clamped shut and injected material is supplied to the mold cavities 103 to form parts such as PET preforms. At a suitable time, mold 116 can be opened separating the core mold half 114 from the cavity mold half 102 in the X axis direction. This allows tool 122 with part carriers 124 to be moved with Z axis carriage 120 along Z axis beam 118 to an inbound position between cavity mold half 102 and core mold half 114 (see FIGS. 2C and 2D), so that the part carriers 124 are appropriately aligned with mold cores 127 of core mold half 114. At this inbound position, the parts that have been formed in mold 116 can held by mold cores 127 can be transferred to the part carriers 124 of the tool 122 in a manner known to those skilled in the art.

Once the parts are transferred to the tool 122, the tool can be moved again to an outbound position along Z axis beam 118 to allow injection molding machine 100 to commence making a new set of injection molded parts. Tool 122 can move to such an outbound position (such as depicted in FIGS. 1, 2A and 2B) where the tool is appropriately aligned with a treatment device 128 of treatment unit 112 so that parts may be appropriately treated such as being thermally conditioned while being held by tool 122. Additionally, certain selected parts when they are ready to be transferred to treatment device 128, can be transferred to the transfer/cooling pins 129 (FIG. 2A) thereon. Treatment unit 112 may be mounted to the side of moving platen 115 with bolts or other conventional attachment devices. By way of reference, an example description of the structure and operation of a treatment unit is disclosed in commonly assigned U.S. Pat. No. 7,104,780 issued Sep. 12, 2006, the entire contents of which is hereby incorporated herein by reference.

Figure 2D:
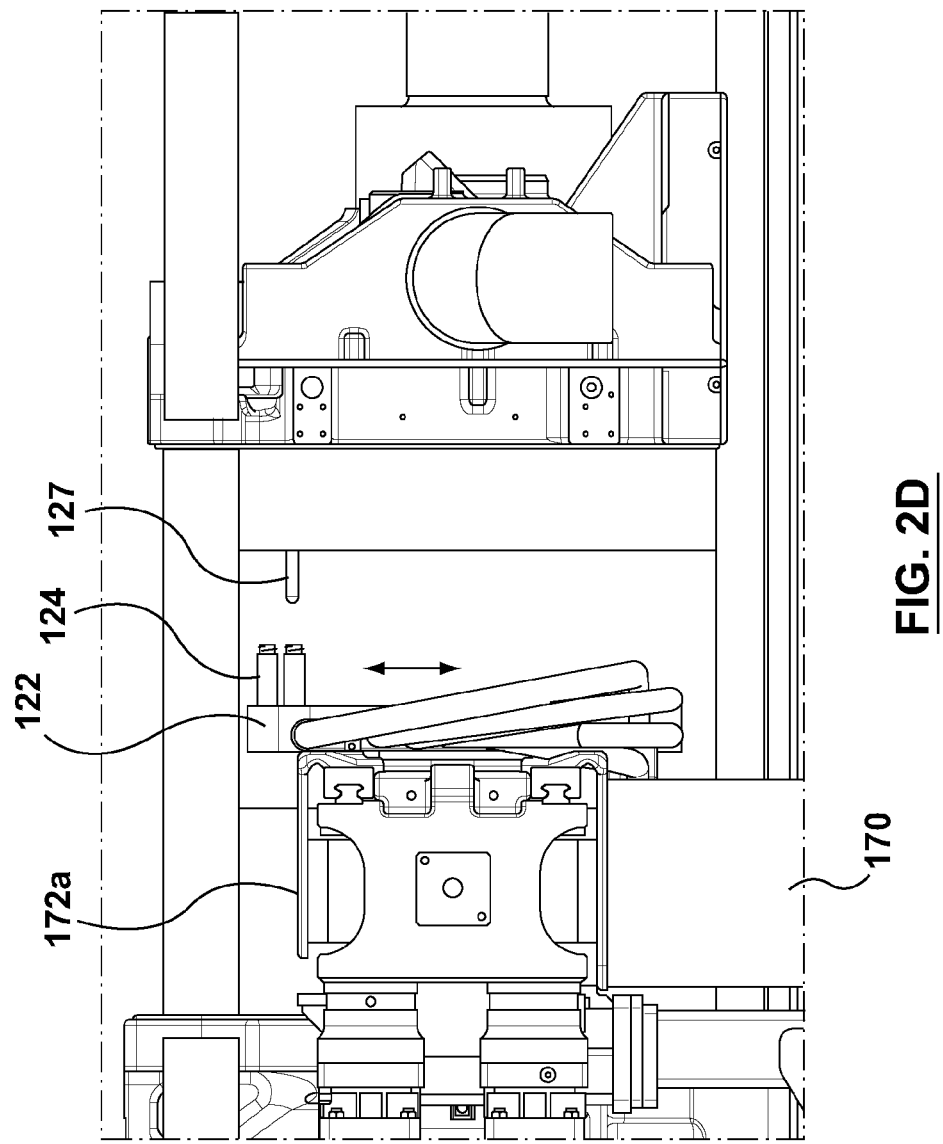
FIG. 2D is a partial side view of the portion of FIG. 2A in the same operational configuration as depicted in FIG. 2C.
Figure 3:
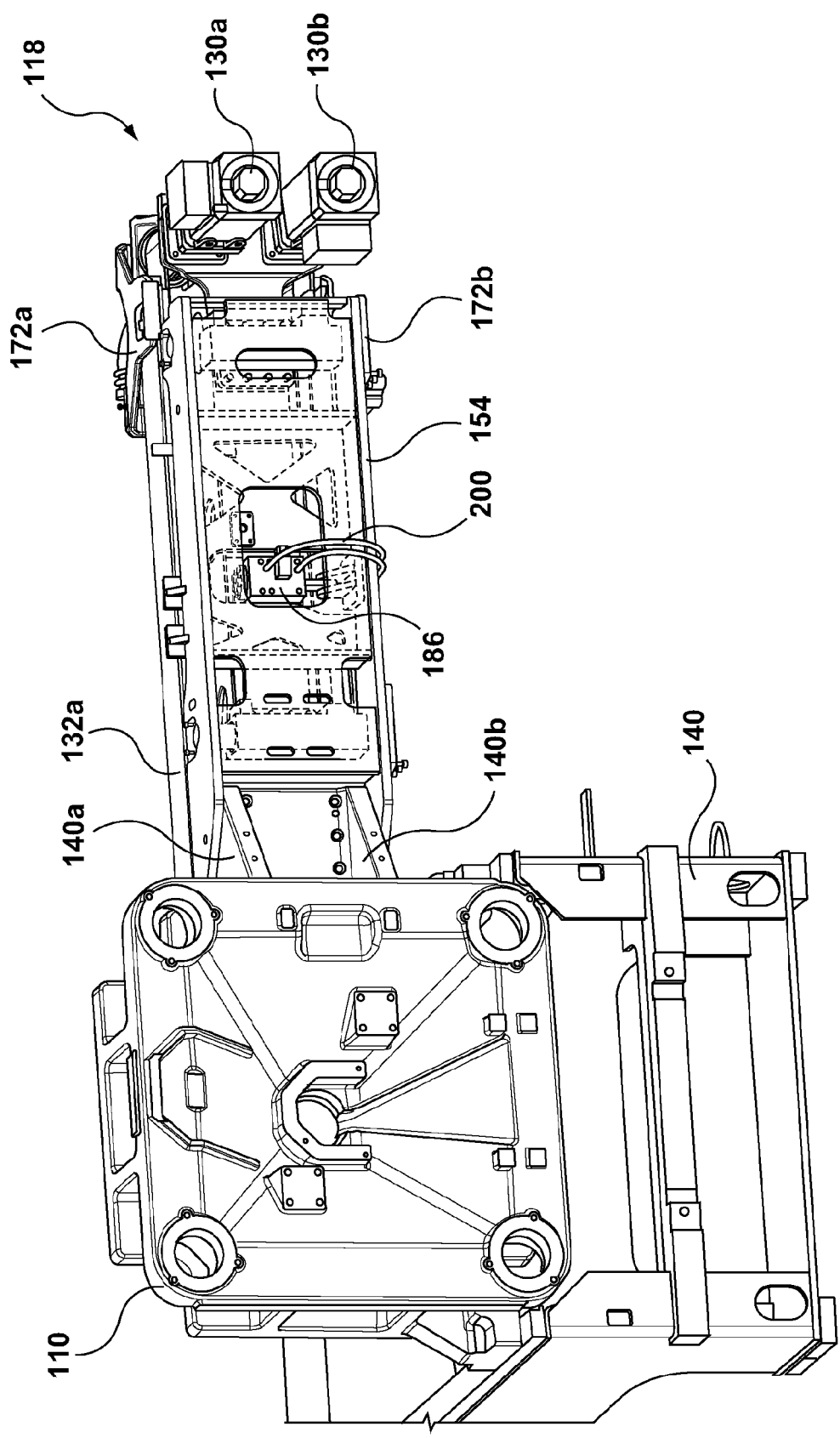
FIG. 3 is a rear perspective close up view of a moving apparatus and stationary platen forming a portion of the machine of FIG. 1.

As previously mentioned, tool 122 may be configured to carry and hold at a single time more than one group of parts made in the mold 116 of injection molding machine 100. In this regard, when retrieving different groups of parts from core mold half 114, it may be necessary to not only adjust the position of tool 122 in the Z axis direction, but also adjust the position of tool 122 in the Y axis direction for each different group of parts. As shown in FIG. 2D the part carriers 124 are at a higher position relative to a given mold core 127 of core mold half 114 than the same carriers relative to the same mold core 127 as depicted in FIG. 2B. While in FIGS. 2C and 2D the tool is shown in an inbound position, tool 122 may be positioned at this same vertical position when the tool is at an inbound position on the Z axis. It will therefore be appreciated that tool 122 may be at an upper or lower position relative to axis Y, at an inbound and/or outbound position on the Z axis. The precise sequence of movement backwards and forwards along the Z axis and up and down relative to the Y axis can be selected for the particular desired sequence of unloading of parts from the mold 116 and loading of parts into treatment device 128

Turning again to FIGS. 2A and 2B in particular, injection molding machine 100 is illustrated with injection unit 104 omitted for simplicity. A frame generally designated 140 generally supports clamping unit 106, moving platen 115, core mold half 114, cavity mold half 102 and stationary platen 110. The core mold half 114 may be mounted to moving platen 115 on frame 140 for reciprocating movement relative to cavity mold half 102, and can, when the mold 116 is closed, be clamped together with cavity mold half 102 with clamping unit 106, in a conventional manner.

Z axis beam 118 may be configured for reciprocating backwards and forwards (typically upward and downward)

movement in a direction generally parallel to the Y-axis. This may be accomplished in a variety of different ways. With reference to FIGS. 2A-D and FIGS. 5A-D, Z axis beam 118 may, by way of example only, consist of two interconnected beam parts: a fixed beam part 154 and a moving beam part 152. Fixed beam part 154 may be fixed to, and not move relative to, the stationary platen 110; and moving beam part 152. Moving beam part 152 may be capable of movement relative to the fixed beam part 154 of Z axis beam 118. Fixed beam part 154 may provide a beam support for moving beam part 152. Moving beam part 152 of Z axis beam 118 may be operable for reciprocating movement in a direction generally parallel to the Y axis relative to the fixed beam part 154. Z axis carriage 120 may be mounted to the moving beam part 152 of the Z axis beam 118. Z axis beam 118 may be mounted to upper and lower horizontal flange plates 140a, 140b that may be integrally formed with, or fixedly attached to, stationary platen 110 (see in particular FIGS. 5A-D).

A conveyor 142 is also illustrated in FIG. 2A, which can be used to transport parts that have been treated by treatment device 112 for further processing. Tool 122 may be mounted to Z axis beam 118 for movement between (1) an inbound position in the Z direction where tool 122 is located between cavity mold half 102 and core mold half 114 and can receive parts 124 ejected from core mold half 114 (see FIGS. 2C and 2D) and (2) an outbound position in the Z direction where tool 122 is aligned for treating the parts 124 with treatment unit 128 of treatment unit 112, and when fully treated, transferring the parts 124 to the treatment device 128 of treatment unit 112. Once treatment such as cooling of a group of parts has been completed, treatment device 128 may be operable to extract the parts from the tool and rotate about an axis parallel to the Z axis to drop the molded and cooled parts onto a conveyor 142.

With reference now to FIGS. 3, 4 and 5A-D, features of Z axis beam 118 are shown in detail in isolation. It should be noted that in FIGS. 5A-D several components associated with Z axis beam 118 have been omitted for clarity. Fixed beam part 154 may be configured to extend generally longitudinally in generally parallel relation to moving beam part 152 and in a direction generally parallel to the Z axis. Fixed beam part 154 may be fixedly attached to stationary platen 110. However, in other embodiments, fixed beam support part 154 may be differently configured and may not be attached to stationary platen 110. Alternate forms of a support base for a moving beam part are contemplated for other embodiments.

As depicted in the present embodiment, moving beam part 152 may be mounted for movement in a direction generally parallel to the Y axis relative to fixed beam part 154. Fixed beam part 154 and moving beam part 152 may be made from one or more suitably strong materials such as by way of example only, steel, aluminum, cast iron, and suitable composite materials. As shown in FIGS. 5A-D, moving beam part 152 may be generally configured with a square or rectangular box beam portion 153 and may have upper and lower outwardly projecting flanges 162a, and 162b. Mounted with bolts 151a, 151b, to each of upper and lower flanges 162a, 162b may be a linear rail 156a, 156b respectively, with each linear rail extending along moving beam part 152 longitudinally in a direction generally parallel to axis Z. Upper linear rail 156a may be engaged by a pair of spaced upper rail carriage blocks 158a. Similarly lower linear rail 156b may be engaged by a pair of spaced lower rail carriage blocks 158b. Upper and lower pairs of carriage blocks 158a, 158b are capable of sliding movement backwards and forwards in the Z direction along their respective linear rails 156a, 156b. An example of a suitable linear rail and carriage block combination that may be employed is a customized version of model no. SHS65-V made by THK Co. Ltd, but any suitable linear rail/block combination may be employed.

Figure 5A:
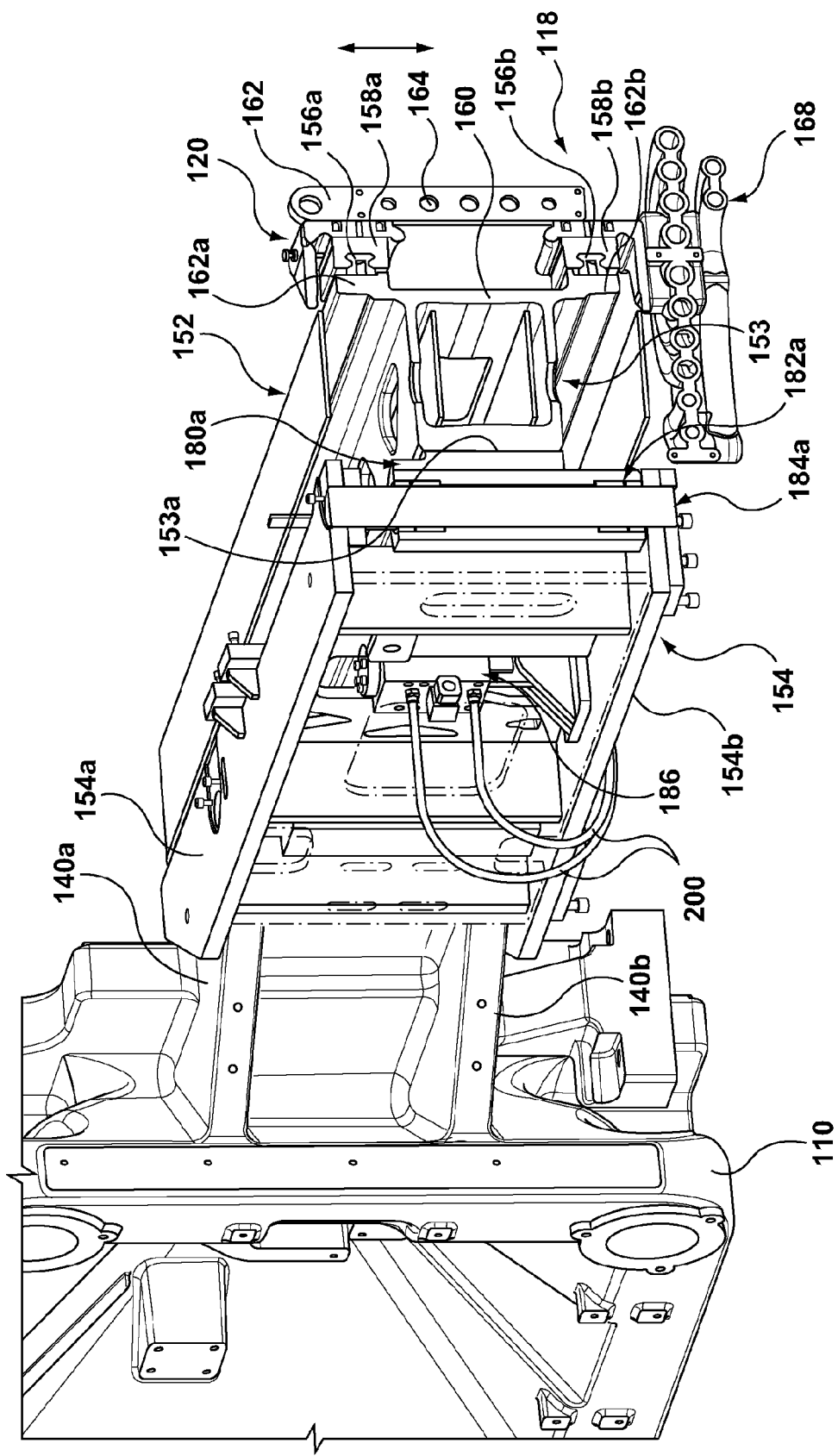
FIG. 5A is a further enlarged rear perspective view showing a portion of the moving apparatus of FIGS. 3 and 4.
Figure 5C:
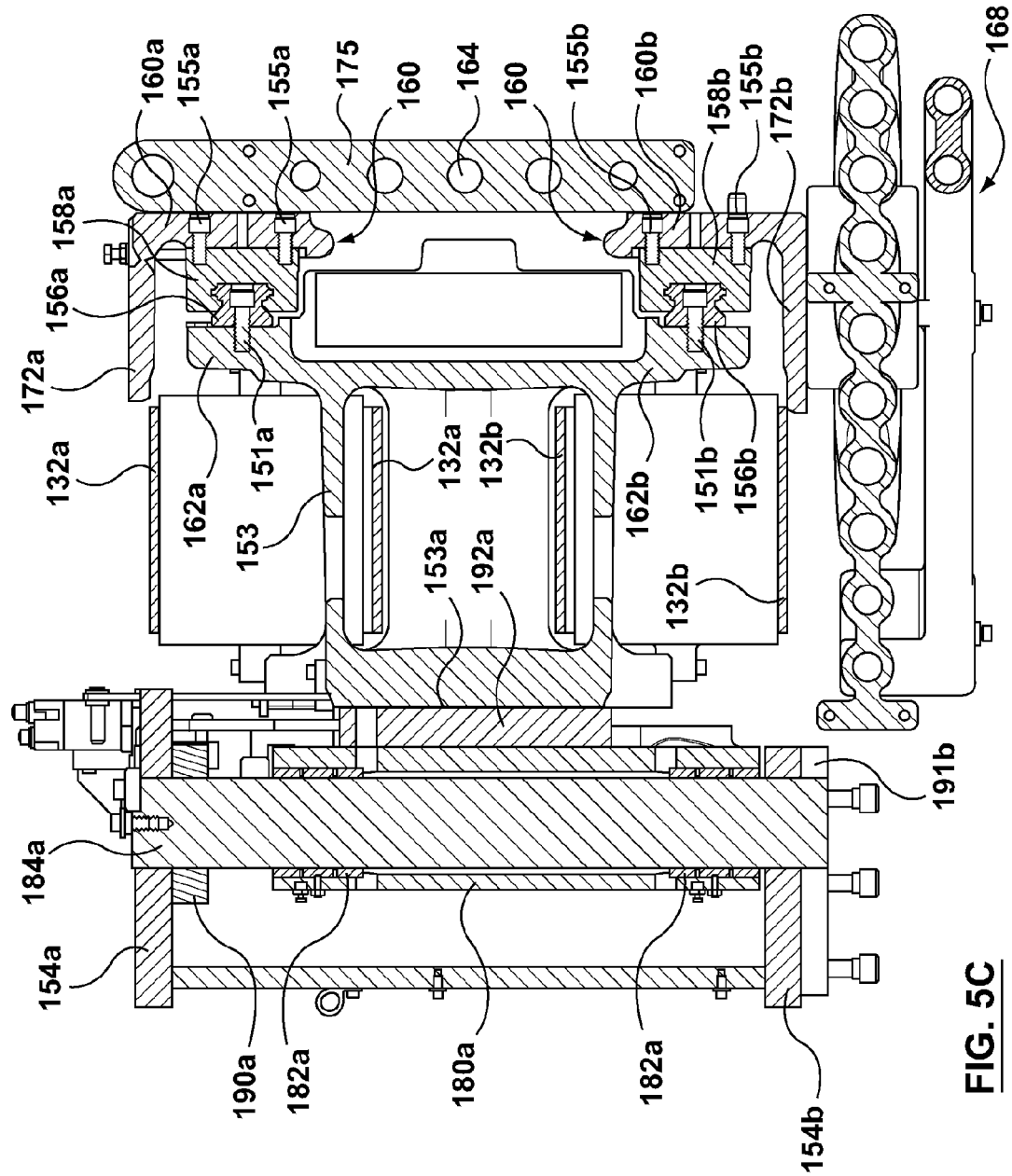
FIG. 5C is a cross sectional view at 5C-5C in FIG. 5B.
Figure 5D:
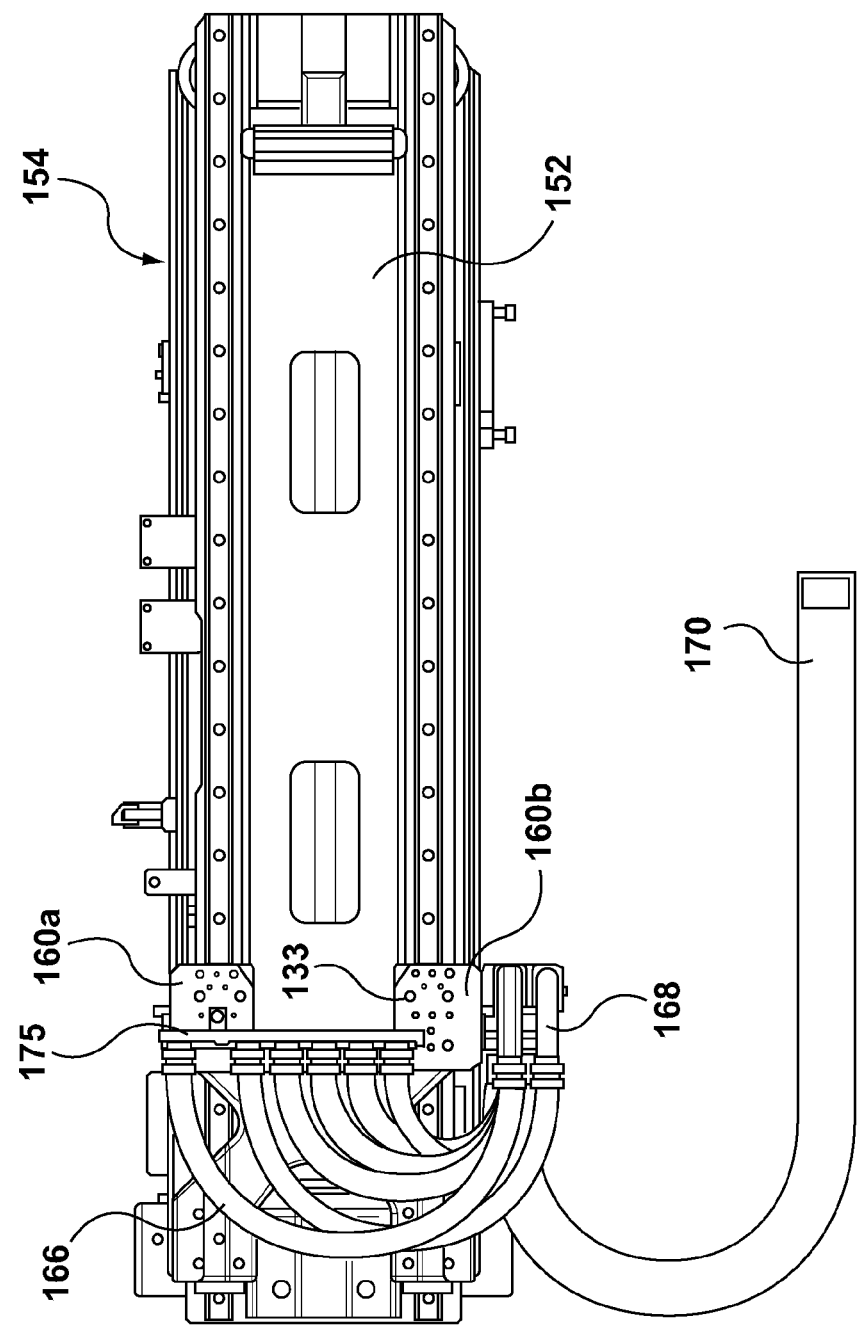
FIG. 5D is a front view of the portion of FIG. 5B.

Carriage 120 may include a mounting bracket generally designated 160 (see FIG. 5C). Mounting bracket 160 may be attached to each of the upper and lower pairs of carriage blocks 158a, 158b. Mounting bracket 160 may have an upper mounting block portion 160a that may be interconnected with bolts 155a to the upper pair of horizontally spaced carriage blocks 158a. Mounting bracket 160 may also have a lower mounting block portion 160b that may be interconnected with bolts 155b to the lower pair of horizontally spaced carriage blocks 158b. The upper and lower mounting block portions 160a, 160b of mounting bracket 160 may be interconnected by a vertically oriented web portion (which is not shown in FIG. 5C). Carriage 120 may also include an upper connecting bracket portion 172a that extends generally transversely parallel to the Z axis and which may be connected to upper mounting block portion 160a of mounting bracket 160. Similarly, carriage 120 may also include a lower connecting bracket portion 172b that extends generally transversely parallel to the Z axis and which may be connected to lower mounting block portion 160b of mounting bracket 160. Upper and lower connecting bracket portions 172a, 172b can be interconnected to upper and lower drive belts 132a, 132b respectively (see FIG. 5C).

Mounting bracket 160 may also be used to attach tool 122 to the carriage 120, with bolts or other conventional attachment mechanisms. This arrangement facilitates the relatively easy interchange of tools 122 onto the carriage 120.

A utility frame member 175 (see FIG. 5C) may extend between upper mounting block portion 160a and lower mounting block portion 160b of carriage 120. Utility frame member 162 may have apertures 164 (see FIGS. 5A-D) which are configured to support the ends of hoses and cables 166 (see FIG. 4) (e.g. water, air, vacuum, power, data, etc.) that connect the tool 122 to a utility block 168. The utility block 168 may itself be supplied with utilities through a hose track/cable track 170 (also referred to as a caterpillar—see FIGS. 2A and 2B). Caterpillar 170 may in some embodiments have a hollow cavity or cavities (not shown) extending along its length. Within the cavity/cavities of caterpillar 170 hoses/wires 171 (see FIG. 8) carrying pressurized air/vacuum/pneumatic fluid/cooling gas/fluid and/or electrical/communication wires can be housed. Caterpillar 170 allows such hoses and wires to move longitudinally and vertically. The hoses and wires 171 may extend from external sources to enter at an inlet 170a of caterpillar 170 and emerge at an outlet 170b connected to the utility block 168. Caterpillar 170 allow the utilities to continued to be connected to utility block 168 during the movement of the moving beam part 152 of beam 118 in the Y direction relative to the fixed beam part 154 of beam 118, and the movement of the tool 122 along with carriage blocks 158a, 158b and mounting blocks 160a, 160b of the carriage 120 in the Z axis direction along moving beam part 152.

Figure 4:
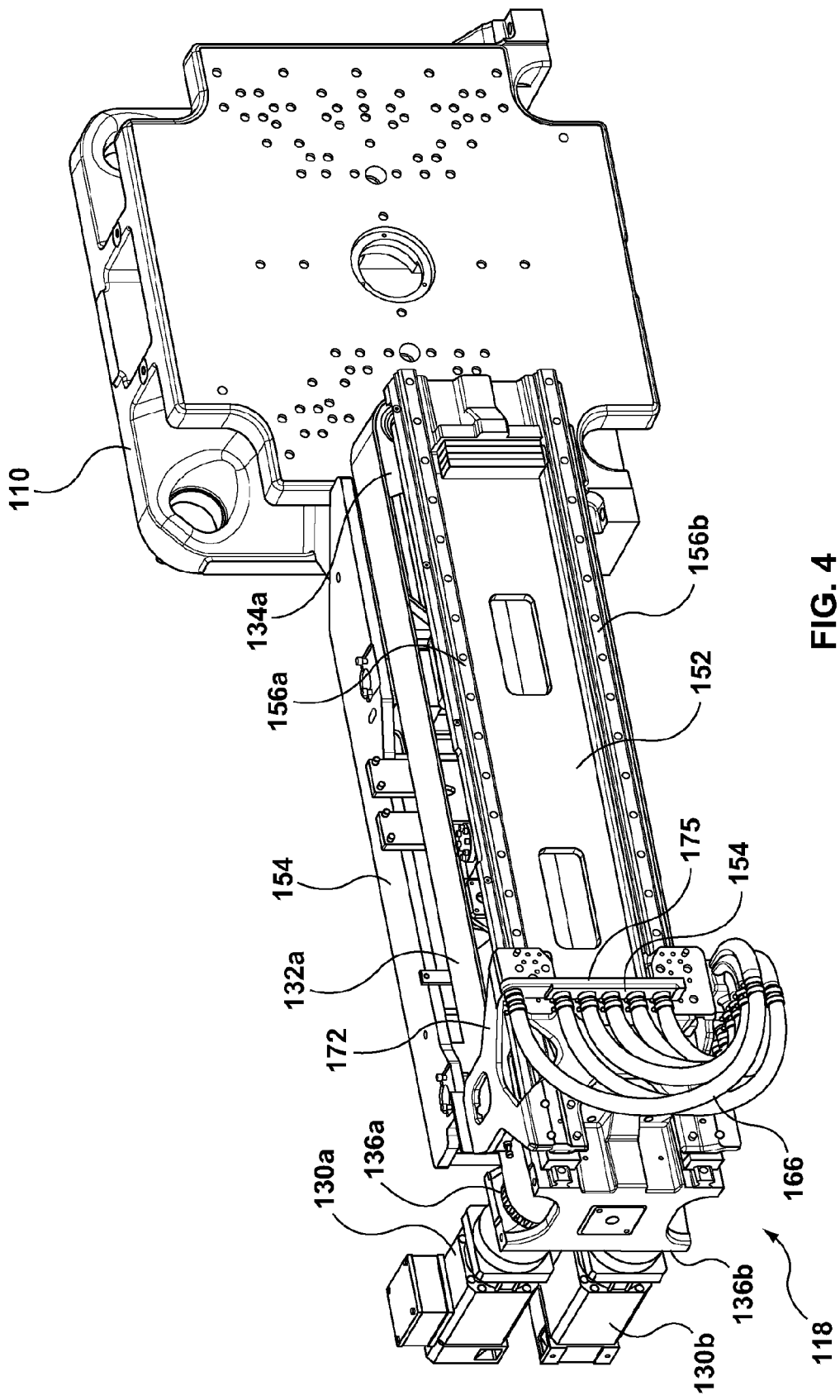
FIG. 4 is a front perspective close up view of the moving apparatus and stationary platen of FIG. 3.

With reference to FIG. 4 it may be appreciated that a Z axis drive apparatus may be provided to drive the carriage 120 and tool 122 backwards and forwards in the Z axis direction relative to the moving beam part 152 of z axis beam 118. An example of a Z axis drive apparatus consists of continuous upper drive belt 132a and continuous lower drive belt 132b (see FIG. 9). Drive belts may be made from any suitable material including rubber. Upper drive belt 132a may extend between a drive wheel 136a and an idler wheel 134a. Drive wheel 136a may be positively interconnected to a drive shaft of an upper servo motor 130a that may be controlled by controller 105 (see FIG. 1). Upper connecting bracket portion 172a may interconnect the mounting bracket 160 of carriage 120 to the upper drive belt 130a by any suitable conventional attachment mechanism such as by way of example only screws (see FIG. 5B), nuts and bolts, clamps, etc. Similarly, lower drive belt 132b may extend between a drive wheel 136b and an idler wheel 134b. Drive wheel 136b may be positively interconnected to a drive shaft of a lower servo motor 130b that may be controlled by controller 105. Lower connecting bracket portion 172b may interconnect mounting bracket 160 of carriage 120 to the lower drive belt 130b of carriage 120. By synchronized operation of upper and lower servo motors 130a, 130b by controller 105, controlled movement of tool 122 along with carriage 120 and carriage blocks 158a, 158b backwards and forwards parallel to the Z axis can be provided. The drive wheels 136a, 136b, idler wheels 134a, 134b and the servo motors 130a, 130b, may all be suitably mounted to a mounting structure 131 that may be fixedly attached to, and form part of moving beam part 152 of Z axis beam 118. The location of the drive belts 132a, 132b and the corresponding location of tool 122 in the Z axis direction may be determined by encoders associated with the upper and lower servo motors 130a, 130b that are in communication with controller 105.

Figure 6:
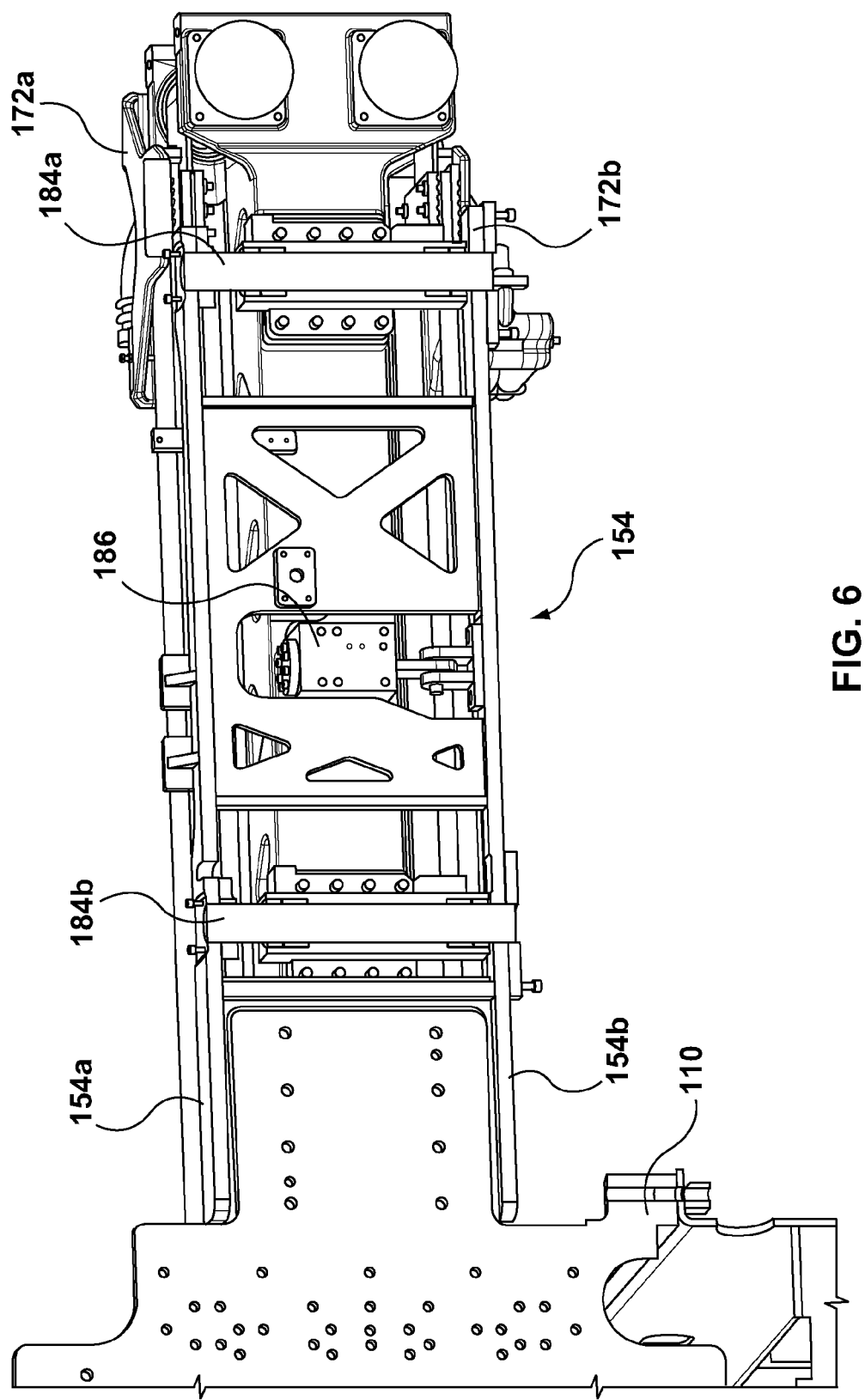
FIG. 6 is a view similar to FIG. 4 but with some parts omitted.
Figure 7:
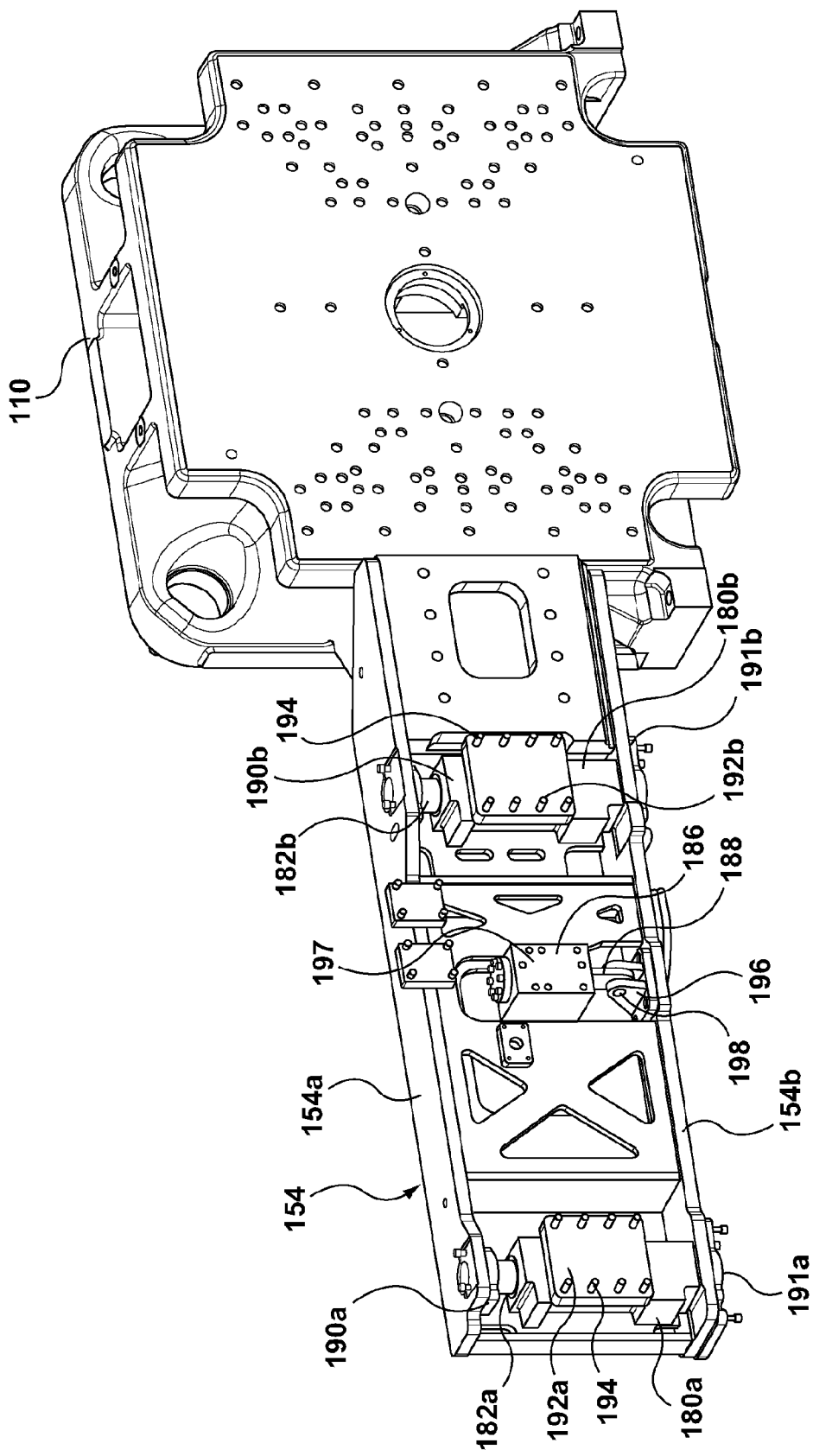
FIG. 7 is view similar to FIG. 4 but with some parts omitted.

Next, an example of an actuation mechanism by which moving beam part 152 of Z axis beam 118 can be moved in up and down generally parallel to the Y axis relative to the fixed beam part 154 is explained with particular reference to FIGS. 5A-D, 6 and 7. As shown in FIGS. 5A and 5C, the box beam portion 153 of moving beam part 152 has a rearward surface 153a oriented generally parallel to the Y axis and that surface 153a extends longitudinally in the Z axis direction. As shown in FIGS. 6 and 7, left and right bushing devices that may respectively include left and right bushing housings 180a, 180b may have respective left and right mounting flanges 192a, 192b with bolts 194 with which to connect the bushing housings to the rearward surface 153a of the rear web of box beam portion 153 of moving beam part 152. Mounting flanges 192a, 192b may be each formed as separate part to, or an integral part of, respective bushing housings 180a, 180b.

With particular reference to FIG. 5C, one bushing device may also include upper and lower bushings 182a that may be press fit into bushing housing 180a and may be configured and oriented vertically to receive guide shaft 184a. Similarly, the other bushing device may include upper and lower bushings 182b that may be press fit into bushing housing 180b and may be configured and oriented vertically to receive guide shaft 184b. Guide shafts 184a, 184b can be oriented generally parallel to Y axis and be fixedly mounted between upper flange 154a and lower flange 154b of fixed beam part 154. Thus, bushings 182a, 182b, bushing housings 180a, 180b and the moving beam part 152 that is fixedly attached thereto, are able to slide up and down in the Y direction on guide shafts 184a, 184b respectively relative to fixed beam part 154.

With reference to FIGS. 5C and 6, to assist in holding guide shaft 184a in place within and between upper flange 154a and lower flange 154b of fixed beam part 154, an upper reinforcement plate 190a may be affixed to the lower surface of upper flange 154a (such as by bolts, welding or other conventional attachment mechanisms) and be configured to surround guide shaft 184a at its upper end. Similarly, a lower plate 191a may be affixed to the lower surface of lower flange 154b (such as by bolts, welding or other conventional attachment mechanisms) and be configured to surround guide shaft 184a at its lower end. Similarly, with reference to FIG. 6, to assist in holding guide shaft 184b in place between upper flange 154a and lower flange 154b of fixed beam part 154, an upper reinforcement plate 190b may be affixed to the lower surface of upper flange 154a (such as by bolts, welding or other conventional attachment mechanisms) and be configured to surround guide shaft 184b at its upper end. Similarly, a lower plate 191b may be affixed to the lower surface of lower flange 154b (such as by bolts, welding or other conventional attachment mechanisms) and be configured to surround guide shaft 184b at its lower end. In this way, moving beam part 152 may be interconnected with fixed beam part 154, through bushing housings 180a, 180b so that the bushing housings and the moving beam part 152 may together move up and down in reciprocal sliding movement on guide shafts 184a, 184b held by fixed beam part 154. The combined surface areas of top flange 154a and reinforcement plate 190a provides for a stronger connection with the guide shaft 184a at its upper end. The combined surface areas of bottom flange 154a and lower plate 191a provides for a stronger connection with the guide shaft 184a at its lower end. Guide shaft 184b has a corresponding stronger connection.

An actuator 186 may also be provided to provide a drive force to effect relative up and downward movement in the Y direction of moving beam part 152 relative to fixed beam part 154. Actuator 186 may be installed between fixed beam part 154 and moving beam part 152. For example actuator 186 may be a double acting hydraulic or pneumatic actuating device having a piston rod 188 that may be affixed at a distal end by a pin 196 passing through an opening in the piston rod 188, with pin 196 being held between two brackets 198 that are themselves fixedly mounted to lower flange 154b of fixed beam part 154. A surface 197 (see FIG. 7) of actuator 186 may be attached to a surface of moving beam part 152. Therefore, when piston rod 188 of actuator 186 is extended, moving beam part 152 will move upwards in the Y direction relative to fixed beam part 154; and when rod 188 of actuator 186 is retracted, moving beam part 152 will move downwards in the Y direction relative to fixed beam part 154. During such movement, bushings 182a, 182b are able to slide up and down in the Y direction on guide shafts 184a, 184b to guide the movement of moving beam part 152 relative to fixed beam part 154. In other embodiments, other types of actuators instead of actuator 186 may be employed including by way of example only, single acting actuators, electric/servo motor actuators, crank and slider actuators, and toggle devices.

Input and output hoses 200 may be delivered with compressed gas/air or hydraulic fluid from a source not shown to the actuator 186 to the actuator 186. The flow of the gas/air/fluid may be controlled by valves (not shown) that may themselves be controlled by controller 105.

With particular reference to FIGS. 5C and 7, the precise end of the upward movement of the bushing housings 180a, 180b on guide shafts 184a, 184b may in each case be controlled or determined by one or more movement limitation mechanisms that may include stopping devices. The stopping devices may comprise the relative configuration of the lower surfaces of reinforcement plates 190a, 190b that engage with the top surface of the bushing housings 180a, 180b respectively. The lower surfaces of reinforcement plates 190a, 190b will engage an upper surface of the respective bushing housing 180a, 180b when the bushing housings move upwards, to provide a stop for further upward movement. The reinforcement plates 190*a*, 190*b* and the bushing housings 180*a*, 180*b* may be of one or more suitable materials such as a hardened steel, that are strong enough to withstand repetitive impacts.

By providing for the same or different vertical positions for the lower surfaces of plates 190*a* and 190*b* (such as for example by shimming one plate and not the other) the bushing housing 180*a* may travel upwards the same or a different amount than bushing housing 180*b* in the Y axis direction. By suitable selection of the stop positions of bushing housings 180*a* and 180*b*, the relative longitudinal orientation of moving beam part 152 about a transverse axis relative to the longitudinal orientation of fixed beam part 154 can be provided so that the tool 122 when attached to moving beam part 152 will be able to properly engage the parts being ejected from the mold 116 when tool 122 is in an inbound position. This relative difference in longitudinal orientation about a transverse axis between fixed beam part 154 and moving beam part 152 may be required for example in order to compensate for deflection of beam 118 when the tool 122 is at the inbound position compared to the outbound position, to ensure that the moving beam part 152 and tool 122 carried thereon are substantially parallel to axis Z, even if fixed beam part 154 is slightly at an angle due to the weight of the tool 122 and carriage 120.

Similarly, the precise end of the downward movement of the bushing housings 180*a*, 180*b* on guide shafts 184*a*, 184*b* may in each case be controlled or determined by a stopping device that may comprise the configuration of the upper surfaces of lower flange 154*b* where the bushing housings 180*a*, 180*b* contact the same during downward movement. The upper surface areas of flange 154*b* will engage a lower surface of the bushing housings 180*a*, 180*b* when the bushing housings move downwards, to provide a stop for further downward movement. By providing for the same or different vertical positions for the contact of the upper surface areas of flange 154*b* and lower surfaces of bushing housings 180*a*, 180*b*, the bushing housing 180*a* may travel downwards the same or a different amount than bushing housing 180*b* in the Y axis direction. By suitable selection of the stop positions of bushing housings 180*a* and 180*b*, the relative longitudinal orientation about a transverse axis of moving beam part 152 relative to the longitudinal orientation about the transverse axis of fixed beam part 154 can be provided so that the tool 122 when attached to moving beam part 152 will be able to properly engage the parts being ejected from the mold 116 when the tool 122 is in an inbound position. The upper and lower stop positions of the bushing housings 180*a*, 180*b* may be in some embodiments be generally fixed and non-adjustable.

Figure 8:
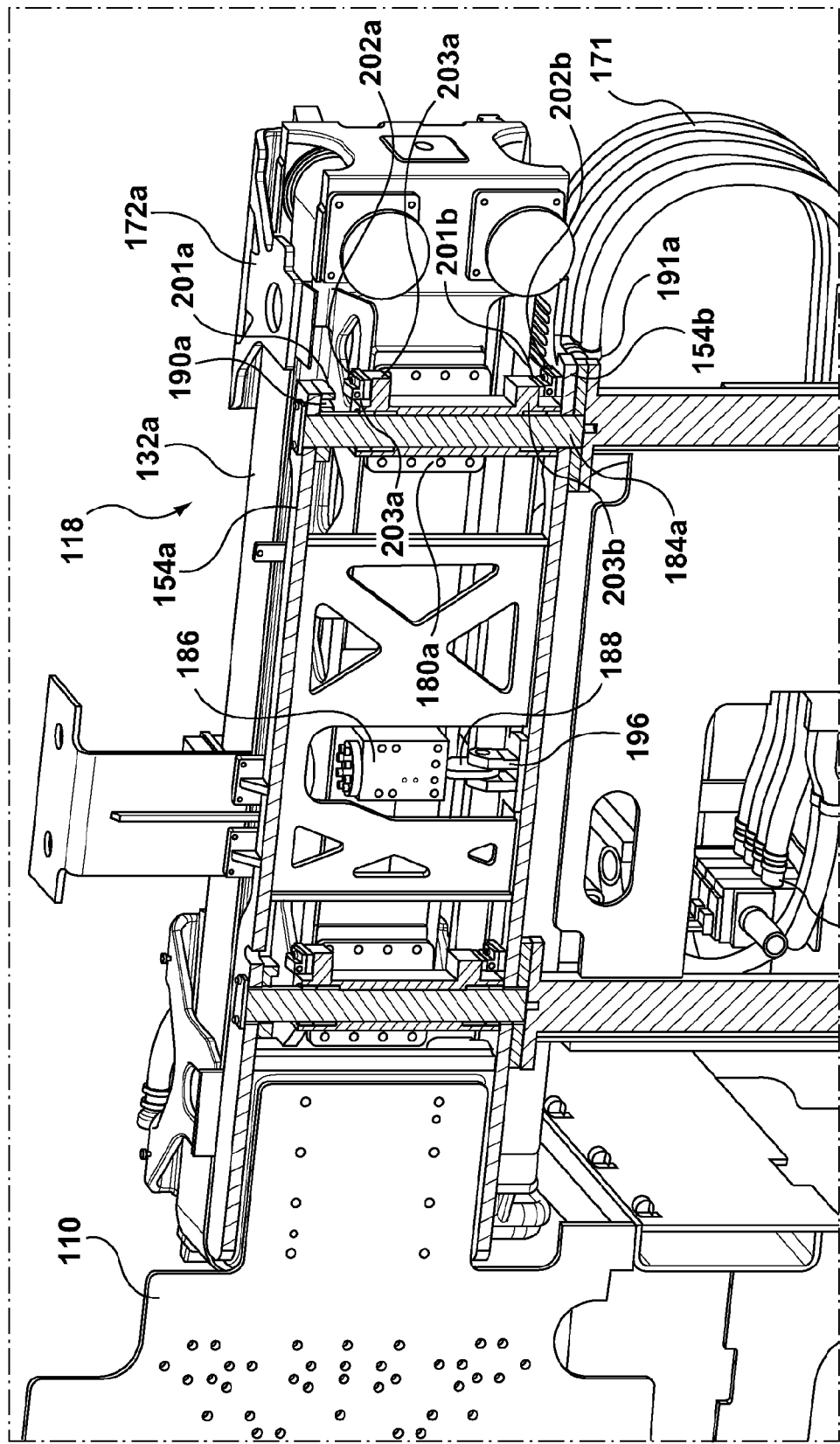
FIG. 8 is a front perspective view that is similar to FIG. 3 but illustrating a beam orientation adjustment mechanism.
Figure 9:
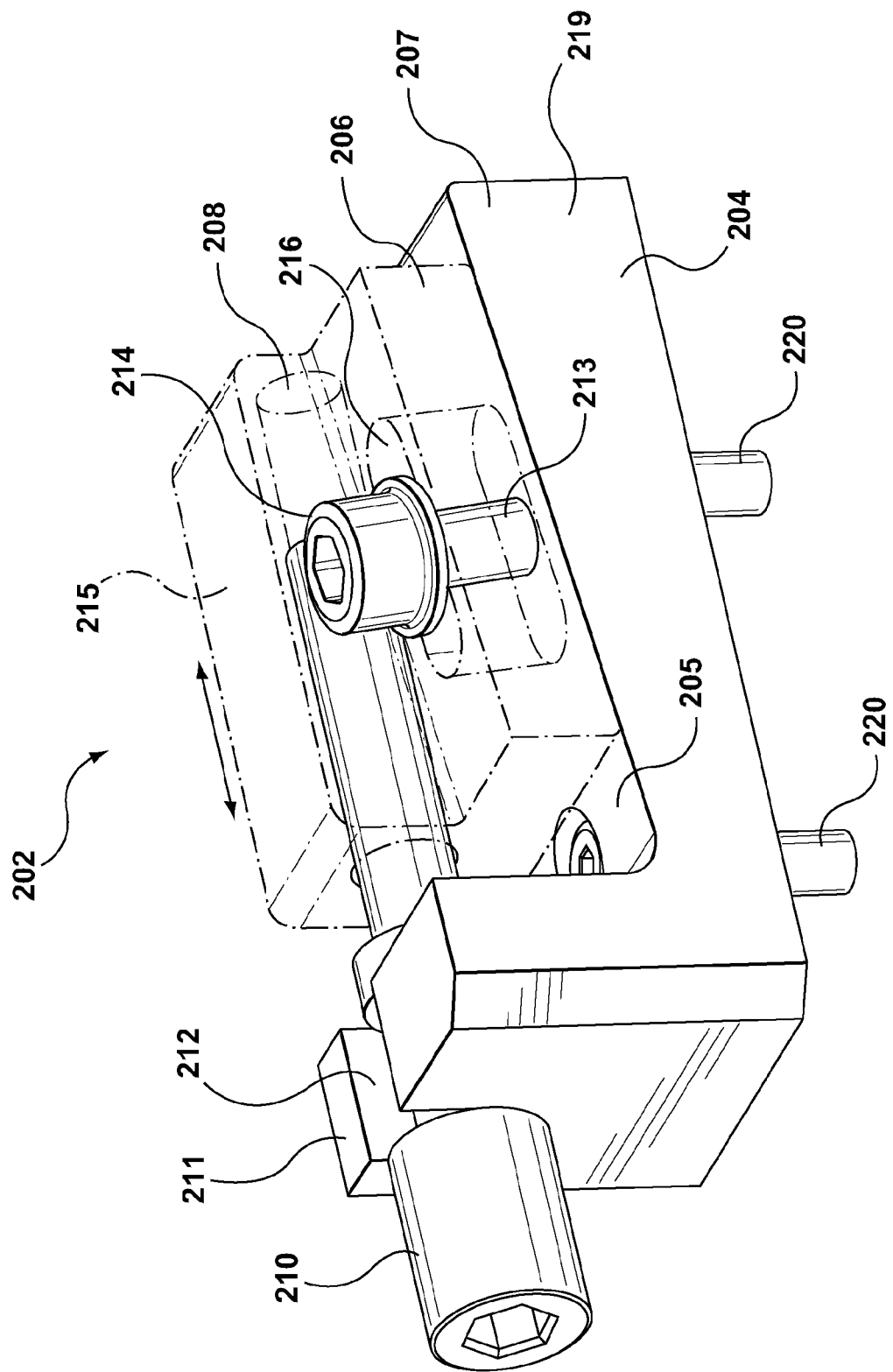
FIG. 9 is a perspective view of part of the adjustment mechanism of FIG. 9.

However, as shown in FIGS. 8 and 9, an example of alternate movement limitation mechanisms that permit for the adjustment of the upper and lower stop positions of the bushing housings 180*a*, 180*b* is illustrated. In this arrangement, bushing housing 180*a* surrounding guide shaft 184*a* includes an upper support block 203*a* and a lower support block 203*b*. On an upper surface of upper support block 203*a* is mounted a stopping device that may be an adjustable stop device 202*a*. Adjustable stop device 202*a* is located to be able to contact a downward facing surface of a stop block 201*a* attached to a lower surface of upper flange 154*a* and thus limit the upward movement of bushing housing 180*a* on guide shaft 184*a*.

On an upper surface of lower flange 154*b* of fixed beam part 154 is mounted another adjustable stop device 202*b*. Adjustable stop device 202*b* is located to be able to contact a downward facing surface of a stop block 201*b* attached to a lower surface lower support block 203*b*, and thus limit the downward movement of bushing housing 180*a* on guide shaft 184*a*. All the components may be made of suitably strong materials such as strengthened steel so that they can withstand repetitive impact forces.

At the other end of Z axis beam 118, bushing housing 180*b* and guide shaft 184*b* may have a similar arrangement as just described with relation to bushing housing 180*a* and guide shaft 184*a*.

FIG. 9 shows a representative stop block device 202 that can be used for one or both of stop block devices 202*a* and 202*b*. Stop block device 202 may have a generally right angled base 204 with a transversely inclined surface 205 of a bottom wall 219. An impact block 206 may rest on base 204 and have a surface 207 that contacts with and can slide on an inclined surface 205 of base 204. An adjustment screw 210 may have a threaded shaft that passes through slot 212 in upstanding wall 211 of base 204 and which can be received into a threaded aperture 208 in base 204. A fixing screw 214 may have a shaft 213 that is received in an aperture in the bottom wall 219 of base 204. When fixing screw 214 is released, it allows adjustment screw 210 to be rotated with clockwise or anti-clockwise movement to provide for transverse backwards or forwards movement of the impact block 206 on base 204. Due to the mating of inclined surfaces 205 and 207, such transverse movement will also either raise or lower the impact surface of impact block 206. When a desired position is obtained for impact block 206, fixing screw 214 can be tightened to secure the impact block 206 at the desired height. Stop block device 202 may be secured to a supporting surface with bolts 220 received through apertures in bottom wall 219 into apertures in the supporting surface.

Figure 10:
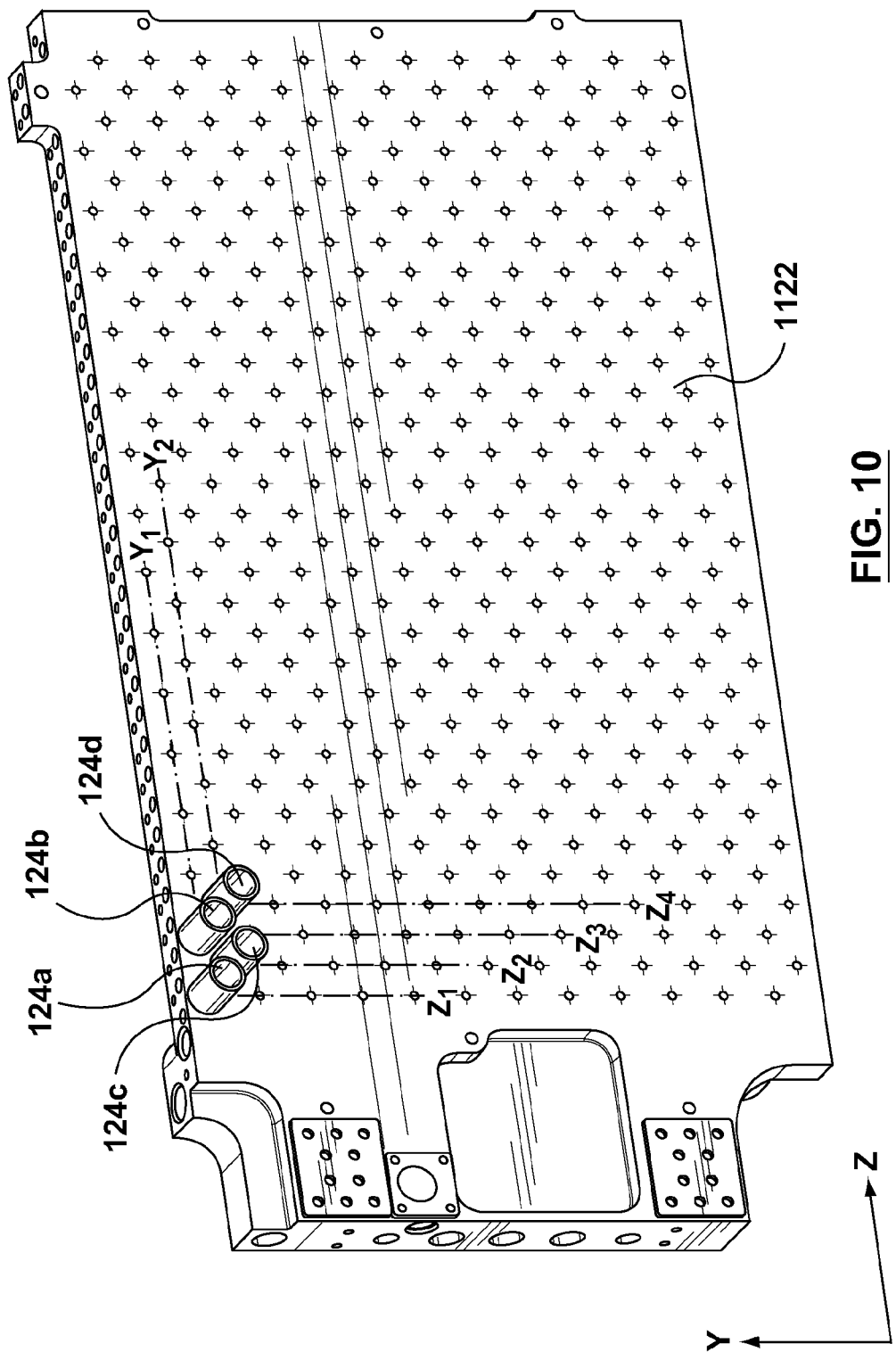
FIG. 10 is a front perspective view of a tool that may be used with the moving apparatus of FIGS. 3 to 9, in the machine of FIG. 1.

It will thus be appreciated that stop block devices 202*a*, 202*b* as depicted in FIG. 9 when configured like stop block device 202 in FIG. 10, can thus be independently adjusted in height to independently vary the upward and downward stop positions of each of the bushing housings 180*a*, 180*b* on their respective guide shafts 184*a*, 184*b*. This can result in being able to vary the longitudinal orientations of the fixed beam part 154 relative to the moving beam part 152 about a transverse axis.

Now with reference to FIG. 10, an example of a tool 122 with a series of part carriers 124*a*, 124*b*, 124*c* and 124*d* is illustrated. In this Figure only one part carrier in each of four groups of part carriers is shown. Thus one group of part carriers 124*a* will be arranged on the tool 122 to receive a first group of parts with tool 122 positioned at a first inbound position and with the tool having a position Z1 on the Z axis and position Y1 on the Y axis.

A second group of part carriers 124*b* will be arranged on the tool 122 to receive a second group of parts with tool 122 positioned at a second inbound position with the tool having a position Z2 on the Z axis and the same position Y1 on the Y axis.

A third group of part carriers 124*bc* will be arranged on the tool 122 to receive a third group of parts with tool 122 positioned at a third inbound position with the tool having a position Z4 along the Z axis and a different position Y2 on the Y axis.

A fourth group of part carriers 124*bc* will be arranged on the tool 122 to receive a fourth group of parts with tool 122 positioned at a fourth inbound position with the tool having a position Z4 along the Z axis and at the same lower position Y2 in the Y axis.

The tool 122 mounted to the foregoing moving apparatus including Z axis beam 118, carriage 129, is capable on successive cycles of appropriately positioning the tool to successively receive the parts held in each of parts carriers 124a-d.

In the foregoing embodiments, one can avoid having a carriage with multiple components that allow the carriage to move both horizontally on the beam and to allow the tool carried by the carriage to move vertically relative to the beam.

Variations to the foregoing are possible. By way of example only, the actuator for effecting movement of the moving beam part 152 relative to the fixed beam part 154 may be capable of providing numerous and possibly an infinite number of different vertical positions of moving beam part 152. For example the actuator may be a servo drive motor controlled by the controller with the servo motor operable to actuate vertical rod in upwards and downwards movement, with the device being positioned between the moving beam part 152 and fixed beam part 154. Other possible actuators include but are not limited to ball screws and lead screws, linear motors, toggles and slider cranks.

In other embodiments, the moving apparatus may be configured such that the moving beam part may move on an axis that is at a non-ninety degree angle relative to the fixed beam part. By way of further examples, in some embodiments, the beam support may be a separate component from the beam and in some further embodiments, the beam support move relative to the stationary platen and/or frame, and with the beam or moving part thereof also being capable of movement relative to the beam support.

It is noted that the foregoing has outlined some of the more pertinent non-limiting embodiments. It will be clear to those skilled in the art that modifications to the disclosed non-embodiment(s) can be effected without departing from the spirit and scope thereof. As such, the described non-limiting embodiment(s) ought to be considered to be merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiment(s) is expressly contemplated herein so that one of ordinary skill in the art would appreciate from this disclosure that features, elements and/or functions of one embodiment may be incorporated into another embodiment as skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

What is claimed is:

1. A moving apparatus operable for moving a tool of an injection molding machine, said moving apparatus comprising:
 a beam comprising a fixed beam part and a moving beam part, wherein the fixed beam part is configured to extend longitudinally in generally parallel relation to the moving beam part generally parallel to a Z axis;
 a carriage for carrying said tool, wherein said carriage is mounted to the moving beam part for reciprocal movement along the Z axis;
 an actuator mounted between said fixed beam part and said moving beam part operable to move said moving beam part in said reciprocating movement parallel to a Y axis;
 a first guide shaft interconnected to said fixed beam part and a first bushing device interconnected to said moving beam part, said first bushing device being supported by and movable on said first guide shaft to permit movement of said moving beam part relative to said fixed beam parallel to the Y axis;
 a second guide shaft interconnected to said fixed beam part and a second bushing device interconnected to said moving beam part, said second bushing device supported by and movable on said second guide shaft to permit movement of said moving beam part relative to said fixed beam parallel to the Y axis;
 a movement limitation mechanism operable for limiting the movement of said moving beam part relative to said fixed beam part, wherein said movement limitation mechanism comprises a first stopping device interconnected to said fixed beam part, said first stopping device operable and positioned to engage said first bushing device to limit the movement of said first bushing device, and a second stopping device interconnected to said fixed beam part, said second stopping device operable and positioned to engage said second bushing device to limit the movement of said second bushing device;
 wherein said first and second stopping members are independently operable to thereby adjust the longitudinal orientation of said moving beam part about a transverse axis relative to the longitudinal orientation of fixed beam part, whereby the tool when attached to moving beam part will be able to properly engage the parts being ejected from the mold when tool is in an inbound position.

2. The moving apparatus as claimed in claim 1 wherein said actuator comprises a first actuator and said moving apparatus further comprises a second actuator operable to effect the movement of said carriage in along the Z axis.

3. The moving apparatus as claimed in claim 1 wherein said fixed beam part is mounted to a side portion of a stationary platen.

4. The moving apparatus as claimed in claim 1 wherein said actuator is disposed between said fixed beam part and said moving beam part.

5. The moving apparatus as claimed in claim 1 wherein said Z axis is substantially orthogonal to said Y axis.

6. A injection molding machine comprising the moving apparatus as claimed in claim 1, wherein said machine further comprises first and second mold halves and wherein machine is operable such said tool can be cycled in reciprocating movement between an inbound position between first and second mold halves and an outbound position wherein said tool is not between said first and second mold halves.

7. A method of moving a tool used in an injection molding machine, said method comprising:
 moving a tool along a beam that generally extends in along a Z axis;
 moving at least a part of the beam along a Y axis substantially orthogonal to said Z axis;
 wherein said beam comprises a fixed beam part and a moving beam part; said moving beam part extending generally longitudinally along said Z axis and said moving beam part being interconnected with said fixed beam part, said moving beam part being movable relative to said fixed beam part along said Y axis; and wherein an actuator moves said moving beam part relative to said fixed beam part;

said tool is cycled in reciprocating movement between an inbound position between first and second mold halves and an outbound position where said tool is not between said first and second mold halves;

wherein when said tool is at said inbound position, said tool may be at one of at least two separate positions along said Y axis;

a stopping device is interconnected to said fixed beam part, wherein said stopping device comprises first and second stopping devices operable and positioned to engage first and second bushing devices, respectively, that are inter-connected to said moving beam part to limit the movement thereof, said first and second bushing devices being supported by and movable on first and second guide shafts interconnected to said fixed beam part to permit movement of said moving beam part relative to said fixed beam part, the method further comprising adjusting the first and second stopping devices whereby the relative longitudinal orientation of said moving beam part about a transverse axis relative to the longitudinal orientation of fixed beam part can be provided so that the tool when attached to moving beam part will be able to properly engage the parts being ejected from the mold when the tool is in an inbound position.

* * * * *

(12) EX PARTE REEXAMINATION CERTIFICATE (221st)
Ex Parte Reexamination Ordered under 35 U.S.C. 257

United States Patent
Ha

(10) Number: US 9,789,638 C1
(45) Certificate Issued: Apr. 27, 2023

(54) MOVING APPARATUS FOR AN INJECTION MOLDING MACHINE

(71) Applicant: Husky Injection Molding Systems Ltd., Bolton (CA)

(72) Inventor: Gerry Ha, Vaughan (CA)

(73) Assignee: HUSKY INJECTION MOLDING SYSTEMS LTD., Bolton (CA)

Supplemental Examination Request:
No. 96/000,409, Jul. 12, 2022

Reexamination Certificate for:
Patent No.: 9,789,638
Issued: Oct. 17, 2017
Appl. No.: 14/767,472
PCT Filed: Jan. 22, 2014
PCT No.: PCT/CA2014/050044
§ 371 (c)(1),
(2) Date: Aug. 12, 2015
PCT Pub. No.: WO2014/138943
PCT Pub. Date: Sep. 18, 2014

(51) Int. Cl.
*B29C 45/42* (2006.01)
*B29B 11/08* (2006.01)
*B29C 45/72* (2006.01)
*B29K 105/00* (2006.01)
*B29K 267/00* (2006.01)

(52) U.S. Cl.
CPC ............ *B29C 45/42* (2013.01); *B29B 11/08* (2013.01); *B29C 45/7207* (2013.01); *B29C 2045/7214* (2013.01); *B29K 2105/258* (2013.01); *B29K 2267/003* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,409, please refer to the USPTO's Patent Electronic System.

*Primary Examiner* — Krisanne M Jastrzab

(57) ABSTRACT

A moving apparatus is disclosed that may be for moving a tool of an injection molding machine. It may comprise a beam having at least a part that extends generally longitudinally in a first direction. The beam may be configured such that the tool can be moved relative to the beam in said first direction. The apparatus may also comprise an actuator for moving the at least a part of the beam in a second direction. Also disclosed is a method of moving a tool. The method may comprise: (a) moving a tool along a beam that generally extends in a first direction; and (b) moving at least a part of the beam in a second direction. The first directions may be orthogonal to second directions.

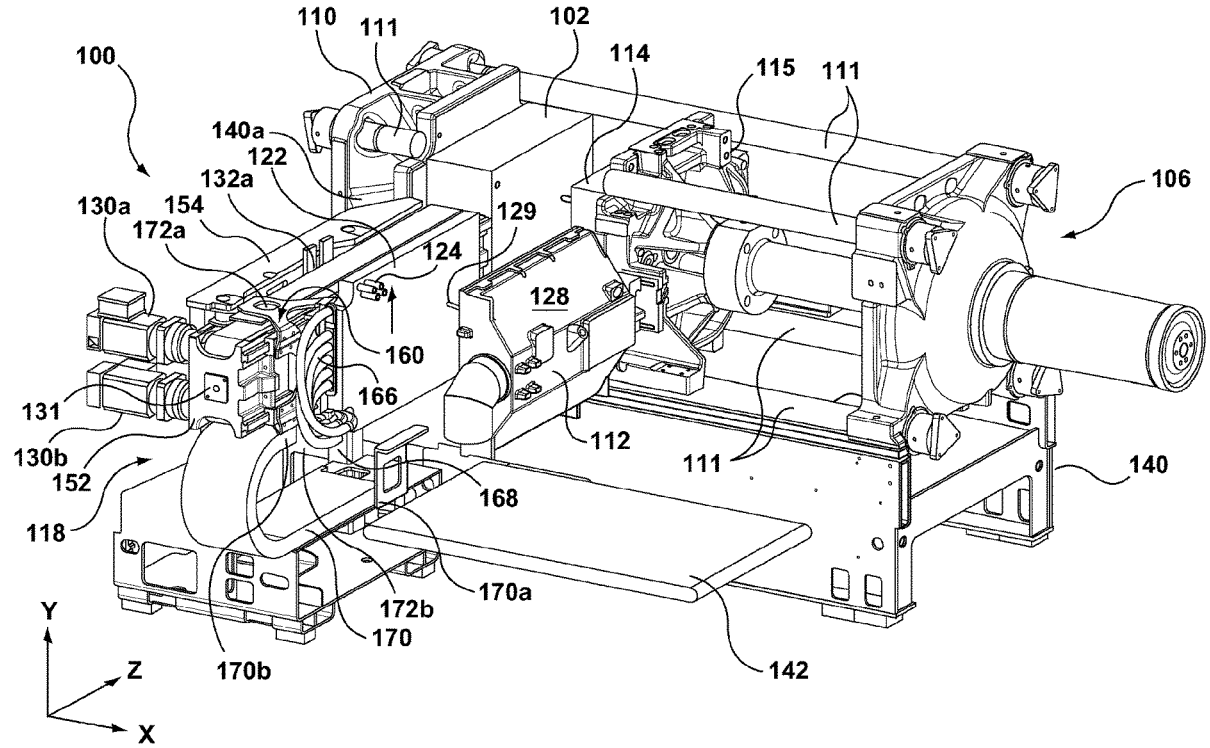

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-7 is confirmed.

* * * * *